United States Patent [19]

Leonard et al.

[11] 4,352,502

[45] Oct. 5, 1982

[54] SUPPORT ASSEMBLY FOR MUD-FLAPS

[76] Inventors: Charles F. Leonard, P.O. Box 99, Rte. 1, Star, Id. 83669; Claude H. Leonard, deceased, late of Star, Id.; legal representative Leonard, P.O. Box 8891, Boise, Id. 83707

[21] Appl. No.: 109,196

[22] Filed: Dec. 31, 1979

Related U.S. Application Data

[63] Continuation-in-part of Ser. No. 869,761, Jan. 16, 1978, Pat. No. 4,189,165.

[51] Int. Cl.³ .............................................. B62D 25/16
[52] U.S. Cl. ............................ 280/154.5 R; 248/289.3
[58] Field of Search ............. 280/154.5 R; 248/289.3, 248/145, 475 B; 403/111

[56] References Cited

U.S. PATENT DOCUMENTS 2,683,013  7/1954  Amundson et al. ................ 248/145
4,007,944  2/1977  Dingess ......................... 280/154.5 R Primary Examiner—Joseph F. Peters, Jr.
Assistant Examiner—Milton L. Smith Attorney, Agent, or Firm—Cushman, Darby & Cushman

[57] ABSTRACT

A mud-flap supporting assembly for mounting a mud-flap on a vehicle including a horizontally disposed arm with a mud-flap attached to it. The arm is mounted for pivotal movement about a vertical pin, and a coil compression spring is provided operatively connected between the arm and an arm portion which is moveable with respect to the arm, for centering the arm so that it is normally in a first position but may pivot against the bias of the spring about the vertical pin out of the first position and will be returned automatically by the spring to the first position. The arm portion includes a first portion fixed to the arm, and a second portion slidably moveable with respect to the first portion, and guided by the first portion, the first portion being deformed to provide a stop to provide the limit of travel of the second arm portion. A bushing is mounted to the first arm portion and receives a guide rod attached to the second arm portion, with a coil compression spring surrounding the guide member and acting between an end plate of the second arm portion and the bushing.

10 Claims, 10 Drawing Figures

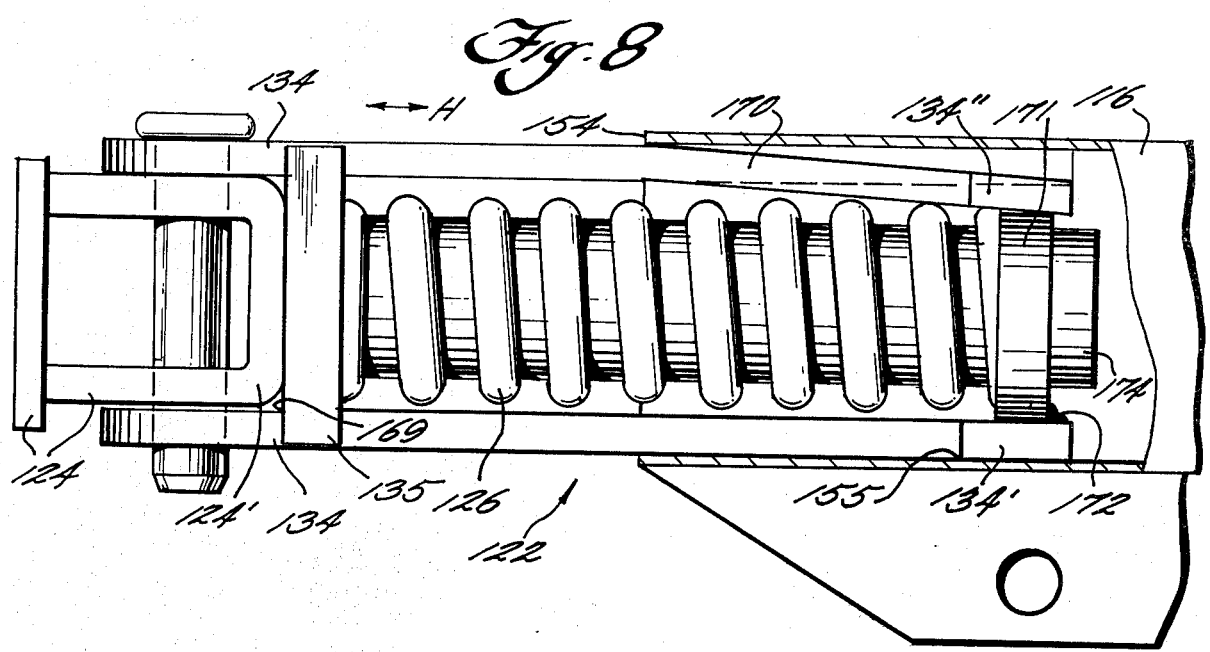
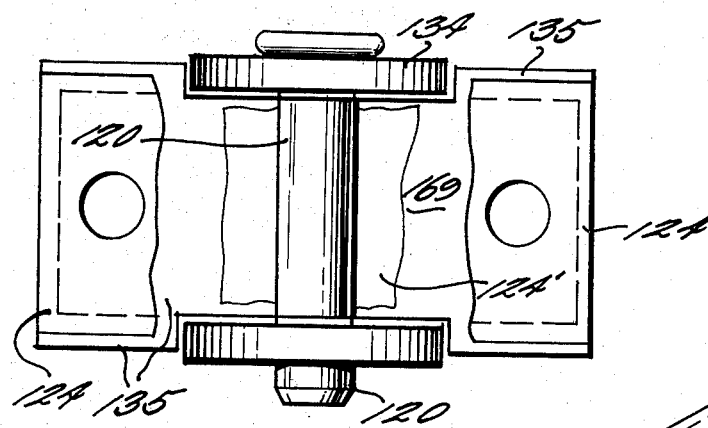
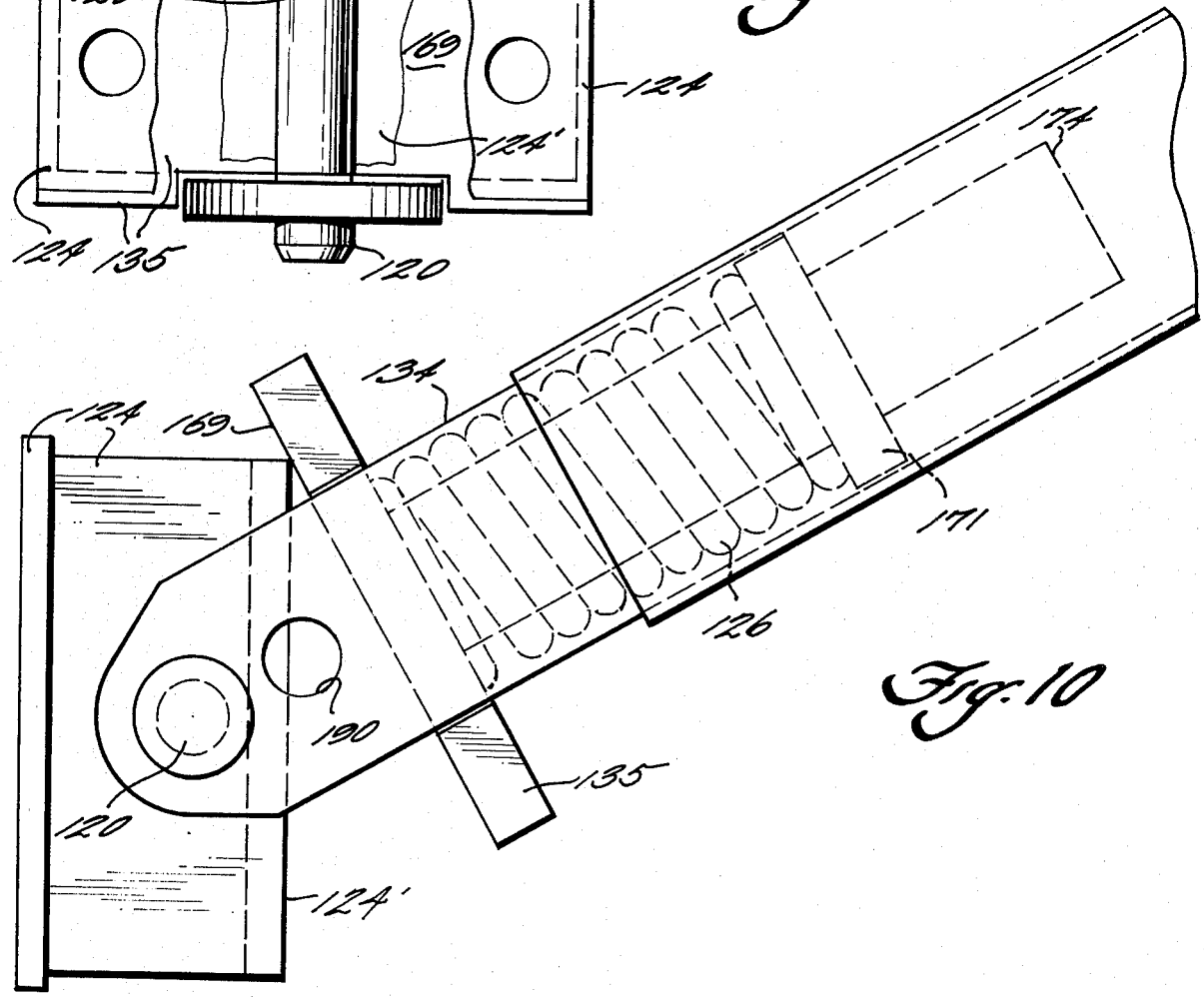

SUPPORT ASSEMBLY FOR MUD-FLAPS

CROSS REFERENCE TO RELATED APPLICATION

This application is a continuation in part of application Ser. No. 869,761 filed Jan. 16, 1978, now U.S. Pat. No. 4,189,165.

BACKGROUND AND SUMMARY OF THE INVENTION

In the past there have been many proposals for the provision of spring loaded arms for mounting a mud-flap on a truck or the like. While such structures have in general been quite useful for logging trucks, in highway situations there have been some disadvantages associated with the general prior art structures. Such prior art structures, as exemplified by U.S. Pat. Nos. 2,652,266 and 2,801,867, have provided for up-and-down movement of the mud-flap in addition to pivotal movement about a vertical axis. When mud or the like builds up on the mud-flaps, however, they have a tendency to droop due to the ability to move up and down, and therefore they do not maintain a constant vertical relationship with respect to the wheel. Also, there is a tendency in such prior art structures for the flaps to bounce and shake when the vehicle to which they are attached goes over small bumps in the road, which bouncing and shaking under some circumstances can have an effect on the life of the flaps. U.S. Pat. No. 4,007,944 shows a prior structure apparently moveable about a vertical axis only, but requiring two separate return springs.

According to the present invention a mud-flap supporting assembly is provided for mounting a mud-flap on the vehicle which is eminently suited for use in highway situations. According to the present invention the assembly comprises a horizontally disposed mounting arm adapted to have a mud-flap attached thereto, and means for mounting the mounting arm to a vehicle at an attachment point including means for substantially preventing movement of the arm in a vertical direction, and means for allowing pivotal movement of the arm about a vertical axis adjacent the operative attachment point of the arm to the vehicle. The means for allowing pivotal movement of the arm about a vertical axis includes a vertical pin, an arm portion for receiving the pin, and a support portion adapted to be connected to the vehicle for receipt of said pin, the pin passing through the arm portion and the support portion. Additionally, spring means operatively connected between the arm and arm portion for centering the arm are provided, so that the arm is normally in the first position but may pivot against the spring bias about the vertical axis out of the first position, and so that it will be automatically returned by the spring biasing means to the first position. The means for preventing movement of the arm in a vertical direction may comprise interfering portions of the arm portion and the support portion, and the spring means preferably comprises a single coil spring having hook-shaped end portions, or a single compression coil spring.

The three preferred assemblies according to the present invention may be removed without a hammer or other special tools, and the springs associated therewith may be readily replaced. According to the first and third embodiments of the invention, the means for preventing vertical movement of the arm also comprises means for mounting the arm and arm portion for horizontal telescopic movement with respect to each other against the bias of the spring means. Stop means are provided for preventing complete separation of the arm from the arm portion should the spring means break, and the arm portion preferably includes a yoke having a pair of arms and a cross portion.

In the first embodiment, the cross portion of the yoke has a slot formed therein for passage of a portion of the spring means into the area between the yoke arms, and the yoke arms have vertically aligned bores for receipt of the vertical pin. The means for allowing pivotal movement of the arm about the vertical axis further comprises a terminating portions of the arm biased into engagement with a portion of the support portion by the spring biasing means, the arm terminating portion comprising a top plate portion that covers the vertical pin in the first position of the arm, but which does not cover the vertical pin when the arm is pivoted away from the first position, a pair of bores being provided in the top plate in the arm portion for receipt of a blocking member to hold the arm against the bias of the spring means in a position to which it has been moved wherein the top plate does not cover the vertical pin.

In the third embodiment, the arm portion comprises first and second arm portions, the first arm portion being rigidly attached to the arm and providing a yoke, and the second arm portion being a cross member that is guided by and slidable with respect to the first arm portion. The second arm portion includes an end plate with a guide rod extending therefrom, and a bushing is provided operatively attached to the first arm portion and arm, the bushing receiving the guide rod. A single coil compression spring is disposed between the end plate and the bushing.

According to a second embodiment of the invention, the means for allowing pivotal movement of the arm about a vertical axis further includes the arm portion formed as a yoke having a pair of yoke arms, at least one lever member pivotally connected to the yoke arms at an intermediate portion of the lever member, and the lever member having one free end thereof in operative engagement with the support portion, and having the other free end thereof retaining the spring means while being slidable with respect to the spring means; the arm and arm portion being rigidly attached together. Access may readily be gained to the spring hooked end portion between the yoke arms for ready removal and insertion of the spring.

It is a primary object of the present invention to provide a simple mud-flap supporting assembly especially suitable for highway vehicles. This and other objects of the invention will become clear from an inspection of the detailed description of the invention, and from the appended claims.

BRIEF DESCRIPTION OF THE DRAWINGS

FIG. 8 is a side view, with portions cut away for clarity, of a third embodiment according to the present invention;

FIG. 9 is an end view, with portions cut away for clarity, of the embodiment of FIG. 8; and FIG. 10 is a top plan view of the embodiment of FIGS. 8 and 9 showing the structure in a break-away position.

DETAILED DESCRIPTION OF THE DRAWINGS

Figure 1:
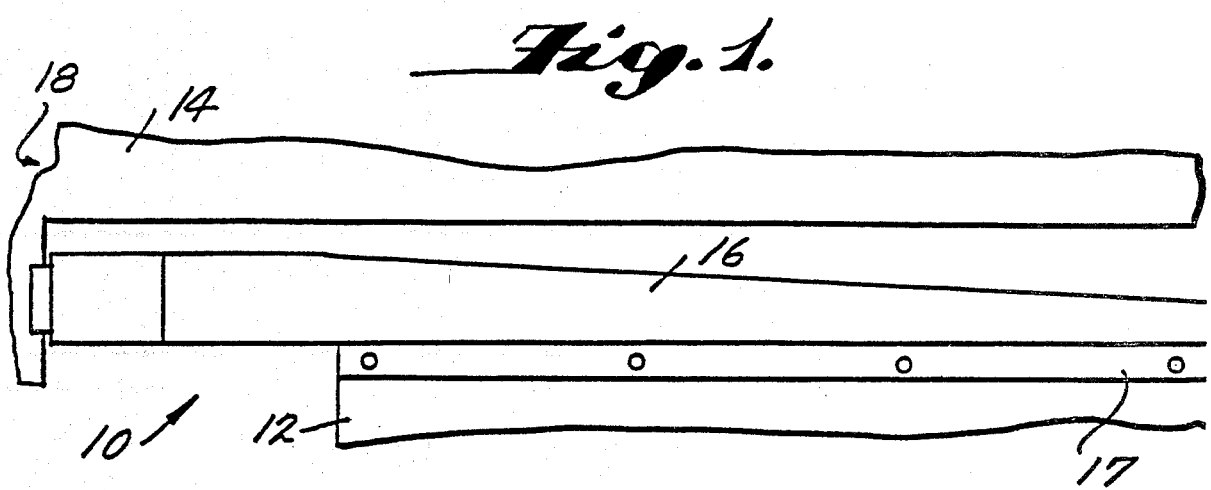
FIG. 1 is a side schematic view showing an exemplary assembly according to the present invention relating to a mud-flap on a vehicle.
Figure 5:
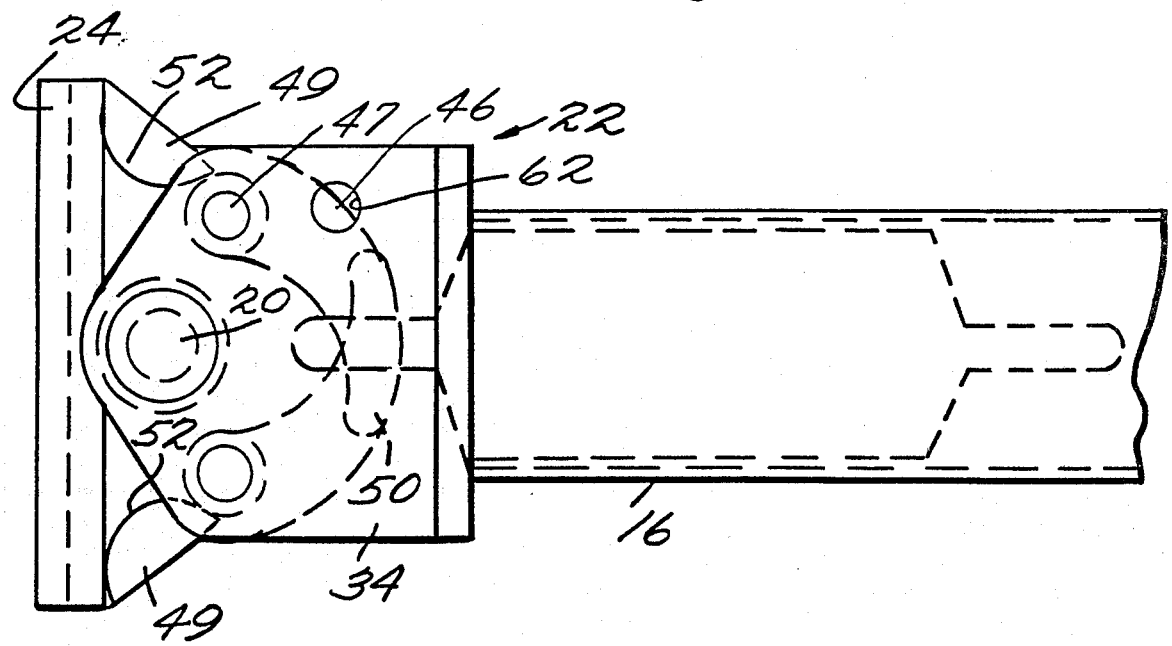
FIG. 5 is a top plan view of the structure of FIG. 4.

A mud-flap supporting assembly according to the present invention is shown generally at 10 in FIG. 1, the assembly 10 for mounting a conventional mud-flap 12 on a vehicle 14, such as a truck, the flap 12 being located directly in back of a wheel or wheels of the truck. The assembly 10 includes a horizontally disposed mounting arm 16 adapted to have the mud-flap 12 attached thereto (as by a conventional depending flange arrangement 17), and means 18 for mounting the arm 16 to a vehicle at an attachment point A (see FIG. 2). The mounting means 18 includes means for substantially preventing movement of the arm 16 in a vertical direction and means for allowing pivotal movement of the arm 16 about a vertical axis V—V adjacent the attachment point A of the arm 16 to the vehicle 14. The means for allowing pivotal movement of the arm 16 about the axis V—V includes a removable vertical pin 20, an arm portion 22 for receipt of the pin 20, and a support portion 24 adapted to be connected to the vehicle 14 for receipt of the pin 20, the pin 20 passing through the arm portion 22 and support portion 24. Spring means 26 are also provided for operatively connecting the arm 16 and arm portion 22 for centering the arm 16 so that it is normally in a first position (as shown in solid line in FIG. 3, and as shown in FIG. 5) but may pivot against the spring bias about the axis V—V out of the first position, and so that it will be automatically returned by the spring means 26 to the first position. The means for preventing movement of the arm 16 in a vertical direction comprises interfering portions 27, 27' and 28, 28' of the arm portion 22 and support portion 24, respectively (see FIGS. 2 and 4).

Figure 2:
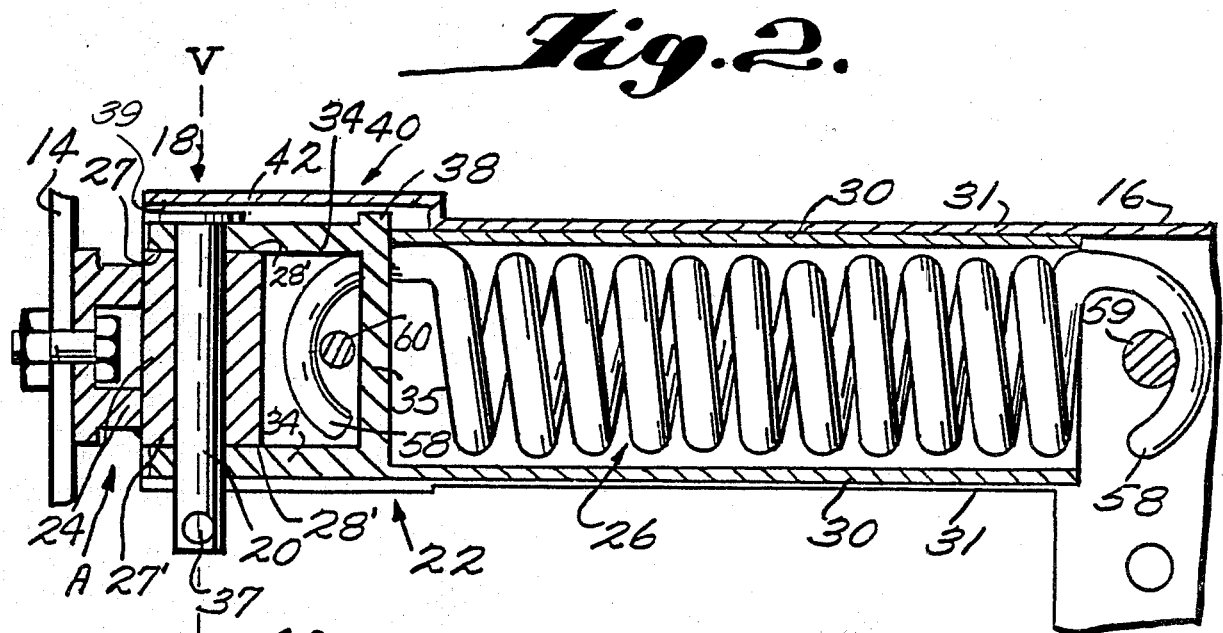
FIG. 2 is a side view partly in cross-section and partly in elevation of the mounting detail of a first embodiment of the present invention.
Figure 3:
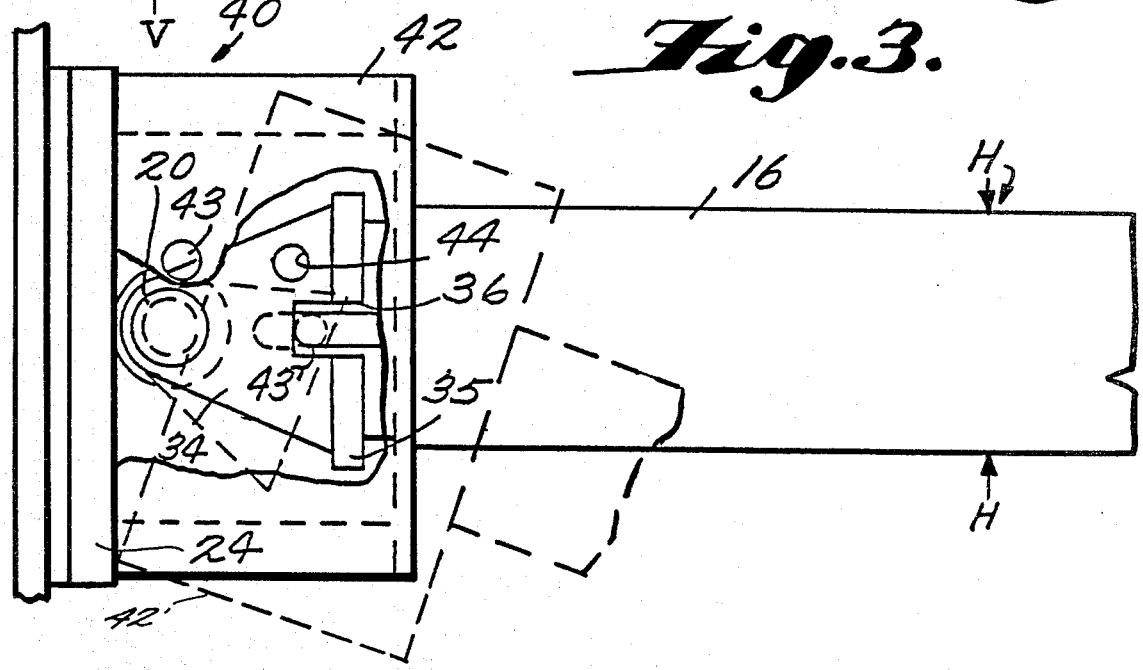
FIG. 3 is a top plan view, with portions cut away for clarity, of the structure of FIG. 2, showing the structure in a break-away position in dotted line.
Figure 6:
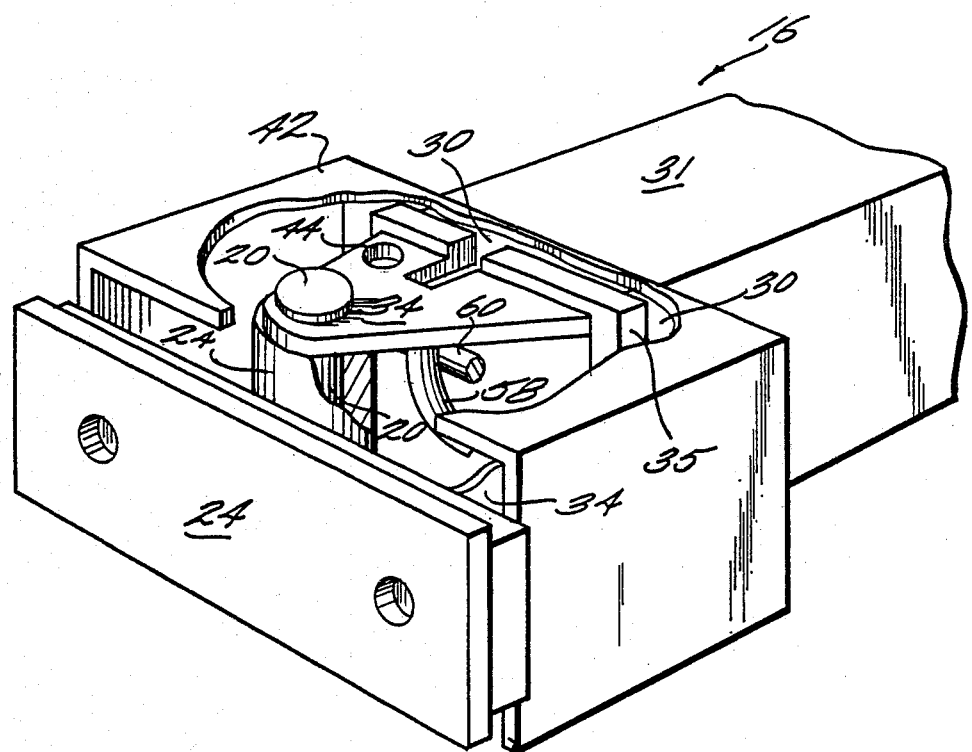
FIG. 6 is a perspective view of the embodiment of FIGS. 2 and 3 with portions cut away for clarity.

One exemplary embodiment according to the present invention is shown in detail in FIGS. 2, 3, and 6. In this embodiment the means for preventing movement of the arm 16 in a vertical direction also comprises telescopic portions 30, 31, for mounting arm 16 for horizontal telescopic movement thereof with respect to the arm portion 22 against the bias of the spring means 26, the telescopic member 31 being connected to the arm portion 22. The arm portion 22 comprises a yoke having spaced yoke arms 34 and a cross portion 35, the cross portion 35 having a slot 36 formed therein (see FIG. 3) for passage of a portion of the spring means (hooked end 58) into the area between the yoke arms. The arms 34 also have vertically aligned bores therein for receipt of the pin 20 (see FIG. 2). The pin 20 may have an opening 37 formed in an exposed portion thereof for receipt of a padlock, spring keeper, or the like for latching the pin 20 in place. The support portion 24 has a bore therein cooperating with the bores in arms 34 for receipt of the pin 20 (see FIG. 2).

In the embodiment of FIGS. 2, 3, and 6 the means for allowing pivotal movement of the arm 16 about the axis V—V further comprises a terminating portion 40 of the arm 16 which is biased into engagement with a portion of the support 24 by the spring means 26. The arm terminating portion 40 includes a top plate 42 that covers the pin 20 in the first positon (solid line in FIG. 3) of the arm 16, but which does not cover the pin 20 when the arm is pivoted away from the first position (see dotted line position in FIG. 3). Stop means are provided for preventing complete separation of the arm 16 from the arm portion 22 should the spring means 26 break, such stop means preferably being provided by a raised portion 38 on the upper arm 34 of the arm portion 22, and a depending lip 39 formed on the bottom face of the plate 42 (see FIG. 2). A pair of bores 43, 44 are defined in the top plate 42 and upper yoke arm 34, respectively. The bores 43, 44 are adapted to receive a blocking member so that when the arm 16 is pivoted to a position wherein the plate 42 does not cover the pin 20, the blocking member can be inserted through the bores 43, 44 to hold the arm 16 and arm portion 22 in that position to allow removal of the pin 20. Preferably, the assembly is constructed so that the arm 16 can pivot in either angular direction about the axis V—V so that it will not be damaged by striking an object whether the vehicle is going forward or in reverse.

Figure 4:
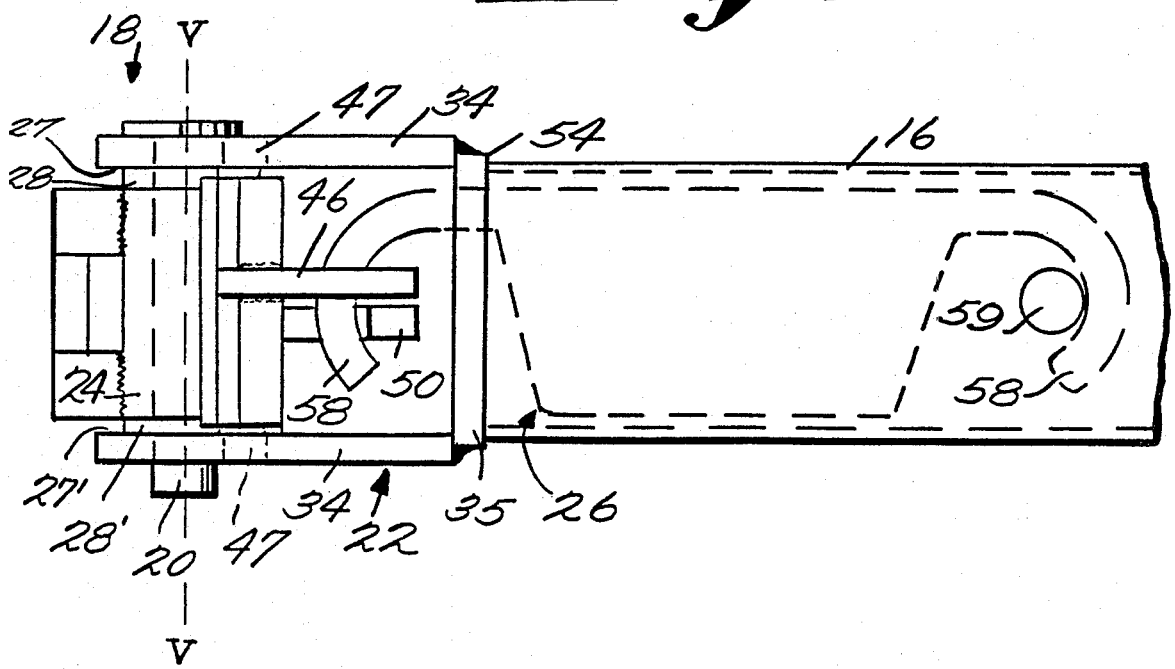
FIG. 4 is a side view, with portions cut away for clarity, of a second embodiment according to the present invention.
Figure 7:
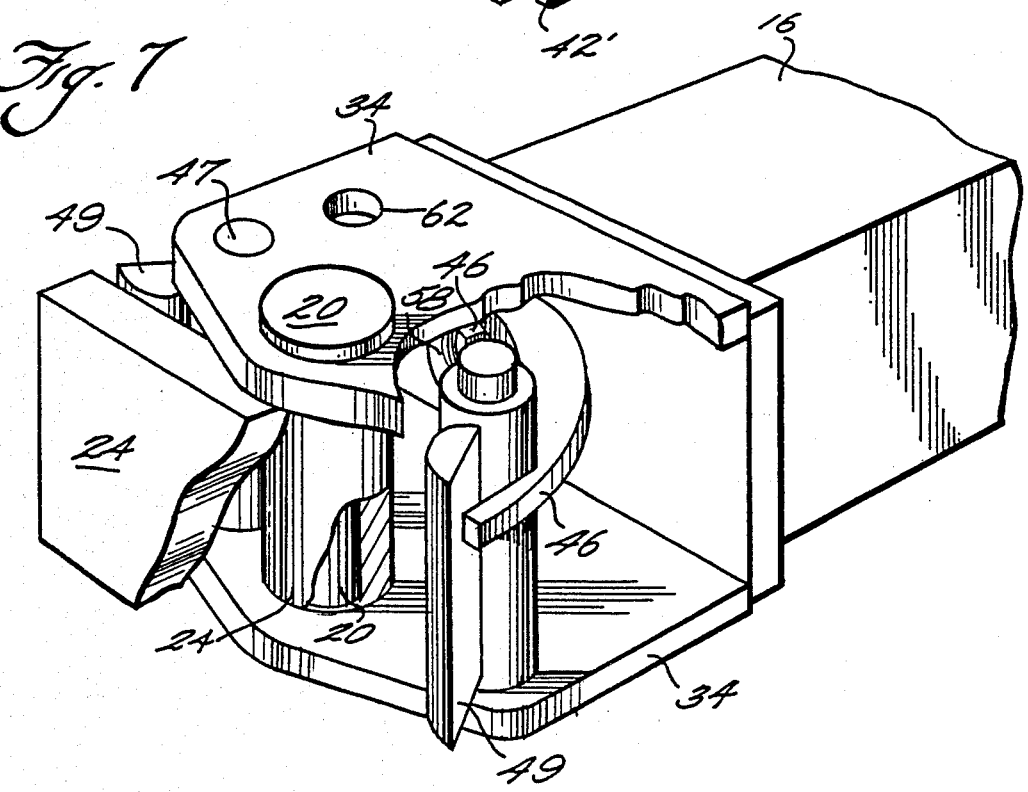
FIG. 7 is a perspective view of the embodiment of FIGS. 4 and 5 with portions cut away for clarity.

A second embodiment according to the present invention is shown in FIGS. 4, 5, and 7. This embodiment differs primarily from the embodiment of FIGS. 2 and 3 in that the arm portion 22 is rigidly connected to the arm 16 (as by a weld 54 or the like—see FIG. 4). In this embodiment, the arm portion 22 also preferably comprises a yoke having a pair of yoke arms 34 and a cross portion 35, the cross portion with an opening (not shown) formed therein for passage of the spring means 26. The means for allowing pivotal movement of the arm 16 about the axis V—V in the FIGS. 4, 5, and 7 embodiment includes at least one lever member 46 pivotally connected to the yoke arm 34 by pins 47 at an intermediate portion of the lever member 46. The member 46 has one free end 49 thereof in operative engagement with the support portion 24, and has another free end 50 thereof retaining the spring means while being slidable with respect to the spring means. The free end 49 of the lever 46 preferably comprises an arcuate portion in operative engagement with the support portion for facilitating pivotal movement of the lever about pins 47, such pivotal movement resulting in extension of the spring means 26. Preferably, a pair of lever members 46 are provided as shown in FIG. 5 (the end 49 of the front lever 46 being cut away in FIG. 4 for clarity) so that the arm 16—rigidly attached to the arm portion 22 by weld 54 or the like (see FIG. 4)—may pivot about the axis V—V whether the vehicle is going backward or forward.

The spring means 26 preferably comprises a coil spring having hook-shaped end portions 58 thereon. In the FIGS. 2, 3, and 6 embodiment, one end portion 58 is disposed around a transverse pin 59 in the interior of the arm 16, while the other end 58 is received by a transverse pin 60 extending across the slot 36 and affixed to the yoke cross portion 35. In the FIGS. 4 and 5 embodiment a pin 59 associated with the arm 16 also is provided, with the other end 58 of the spring means 26 being received by the lever ends 50 as previously described. In either embodiment an opening may be formed in one of the generally horizontally extending portions thereof for receipt of the pin 20 when the arm 16 is removed from the vehicle 14 (such as the opening 62 in top yoke arm 34 of the FIG. 5 embodiment).

The third embodiment according to the present invention is illustrated in FIGS. 8 through 10, and includes the arm 116, vertical pin 120, support portion 124 including an end face 124', arm portion 122, and spring means 126. In this embodiment, a single compression spring 126 is utilized rather than a tension spring as in the first and second embodiments.

In the third embodiment, the arm portion 122 includes first and second arm portions. The first arm portion is formed by yoke arms 134 which are rigidly attached to the mounting arm 116, as by a weld at 154 and/or 155, and includes a pair of yoke arms 134 receiving a bushing 171 at one end (134') thereof, and receiving the vertical pin 120 at the other end thereof, and being disposed in interferring relationship with support 124 at said other end thereof. The second arm portion includes a cross member 135 for the yoke arms 134 that is slidable in the horizontal dimension H (see FIG. 8) with respect to the arms 134. The cross member 135 preferably is formed as an end plate having a generally H-shaped configuration (see FIG. 9), receiving the yoke arms 134 between the legs of the H (see FIG. 9), and having an end face 169 abutting the end face 124' of the support portion 124.

The bushing 171 is operatively attached to the first arm portion 134 and the mounting arm 116, as by weld 172, and the bushing 171 receives a guide rod 174 affixed to the plate 135. The single coil compression spring 126 is disposed between the plate 135 and bushing 171, and preferably an end portion (such as 134") of at least one of the yoke arms 134 is bent downwardly as indicated at 170, to provide a stop to limit the movement of the plate 134 toward the bushing 171. Preferably, the spring 126 is not affixed to the bushing 171 or the plate 135, so that when the pin 120 is removed and the plate 135 slid off of the yoke arms 134, the spring 126 may be removed and replaced. FIG. 10 illustrates this embodiment in a break-away position, the face 169 engaging the support portion 124' to effect compression of the spring 126.

Assemblies according to the present invention having been described, an exemplary manner of operation thereof will now be set forth:

For the FIGS. 2, 3, and 6 embodiment, one end 58 of the spring means 26 is passed through the slot 36 so that it engages the pin 60 while the other end 58 is free, and the yoke arms 34 are passed over the support portion 24 so that the bores therein are in alignment and the portions 27, 27'-28, 28' in interfering relationship. The pin 20 is then disposed through the bores, and locked in place by a retainer in the opening 37. The arm 16 is then slipped over the arm portion 22, the telescoping segments 30, 31 thereof being in telescopic engagement, and the plate 42 extends so that it covers the pin 20. The stop portions 38, 39 are constructed to allow assembly in this manner (as by providing a cam portion on one end of the members 38, 39 but not on the other, or making the member 39 removable). Then the other end 58 of the spring means 26 is grasped and hooked over the pin 59, the structure then being in operative position. Upon receipt of a force having a horizontal vector H (see FIG. 3) in either direction, the arm 16 will pivot (such as is shown in FIG. 3 in dotted line) with the arm 16 being displaced horizontally from the arm portion 22 so that damage to the arm 16 does not result, the spring means 26 returning the arm 16 to the original position (solid line in FIG. 3) after the obstruction is passed. When removal of the arm 16 is desired, the arm 16 is merely moved manually to the position wherein the plate 42 does not cover the pin 20 (pivoted just past the dotted line position in FIG. 3 with the edge 42' of mounting arm 16 engaging the support 24), a blocking member is inserted in the bores 43, 44, and the pin removed. This procedure can be effected in reverse for assembly of the arm 16 in place, if desirable, and where access to the transverse pin 59 is difficult because of the construction of the device.

For the FIGS. 4, 5, and 7 embodiment, the arm 16 and arm portion 22 are fastened to the vehicle, the spring end 58 being between the yoke arms 34 is stretched out and the lever ends 50 pivoted so that they engage the end 58, the arms 34 are disposed over the support portion 24 so that the bores therein are aligned, and the pin is inserted through the bores. Disassembly is effected merely by removing pin 20. Again, the arm 16 may pivot about the pin 20 in response to a horizontal force component in either direction to prevent damage to the arm 16, pivotal movement of the levers 46 effecting spring elongation during pivoting about the axis V—V, and the spring means 26 effecting return to the original position (see FIG. 5).

For the embodiment of FIGS. 8-10, the guide rod 174 is passed through a compression coil spring 126 until the spring 126 abuts the end plate 135, the guide rod 174 is inserted between the yoke arms 134, and the end plate 135 is slid into operative engagement with the yoke arms 134 so that the legs of the H formed by the end plate 135 straddle the yoke arms 134 (see FIG. 9). The entire mounting arm 116, with yoke arms 134 rigidly attached thereto, is then mounted in operative relationship with the support 124 so that the yoke arms 134 receive the support 124 therebetween with the portion 124 in abutting engagement with the face 169 of the plate 135, and relative movement between the arm 116 and support 124 is effected until the bores formed in yoke arms 134 and support portion 124 are in alignment to receive the pin 120. Then the pin 120 is inserted in place in the bores. Should the arm 116 encounter an obstruction, it will cause the arm 116 to pivot about the pin 120 with the face 169 of plate 135 in engagement with the support portion 124, compressing the spring 126 as indicated in FIG. 10. Once the obstruction is passed, the bias of the spring 126 against the plate 135 will automatically return the arm 116 to its original position (FIGS. 8 and 9). Should it be desired to hold the structure in the breakaway position for ready removal of the pin 120, an accessory pin can be inserted through the bore 190 (see FIG. 10) in the yoke arms 134, to abut the support portion face 124' to hold the spring compressed until the pin 120 can be removed.

It will thus be seen that according to the present invention a mud-flap supporting assembly has been provided which is eminently suitable for highway use, not drooping from mud which may build up on the flap and preventing bouncing and shaking of the flap. The assembly is simple and easy to manufacture, repair, and attach in the field, without the use of special equipment, and allows for ready replacement of the spring biasing means (preferably a single coil spring). While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A mud-flap supporting assembly, for mounting a mud-flap on a vehicle, comprising a horizontally disposed mounting arm adapted to have a mud-flap attached thereto; means for mounting said mounting arm to a vehicle at an attachment point, including means for substantially preventing movement of said arm in a vertical direction, and means for providing pivotal movement of said arm about a vertical axis adjacent the operative attachment point of the arm to the vehicle; said means for providing pivotal movement of said arm about a vertical axis including a vertical pin, an arm portion for receipt of said pin, and a support portion adapted to be connected to the vehicle for receipt of said pin, said pin passing through said arm portion and said support portion;

spring means operatively connected between said arm and arm portion for centering said arm so that it is normally in a first position but may pivot against the bias of said spring means about said vertical axis out of the first position and so that it will be automatically returned by said spring means to the first position; said means for preventing movement of said arm in a vertical direction comprising interfering portions of said arm portion and said support portion, and means for mounting said arm and arm portions for horizontal telescopic movement with respect to each other against the bias of said spring means;

said arm portion comprising first and second arm portions, said first arm portion being rigidly attached to said arm and receiving said vertical pin, and said second arm portion being mounted for slidable movement with respect to said first arm portion and including a guide member received by a bushing operatively connected to said first arm portion and said arm to provide said telescopic movement of said second arm portion with respect to said arm;

said second arm portion further comprising an end plate portion affixed to said guide member and having surface portions thereof engaging said first arm portion for providing slidable movement therebetween, and said second arm portion having a flat end face portion for abutting said support portion under the bias of said spring means, said support portion being flat at a major area of engagement between it and said end plate and having edge portions for engaging said end plate during pivoting of said arm and spring means comprising; and a coil spring surrounding said guide member and operatively engaging said arm bushing for receipt of said guide member, and said second arm portion end plate.

2. An assembly as recited in claim 1 wherein said spring means consists of said coil spring surrounding said guide member.

3. An assembly as recited in claim 1 wherein said first arm portion is formed as a yoke having a pair of spaced yoke arms with said bushing mounted between said yoke arms adjacent a first end thereof, and wherein a second end of each of said yoke arms receives said vertical pin.

4. An assembly as recited in claim 1 wherein said end plate portion has a generally H-shape, receiving said first arm portion between the legs of the H, and abutting said support portion along the end face thereof during pivoting thereof against the bias of said spring means.

5. A mud-flap supporting assembly, for mounting a mud-flap on a vehicle, comprising a horizontally disposed mounting arm adapted to have a mud-flap attached thereto; means for mounting said mounting arm to a vehicle at an attachment point, including means for substantially preventing movement of said arm in a vertical direction, and means for providing pivotal movement of said arm about a vertical axis adjacent the operative attachment point of the arm to the vehicle; said means for providing pivotal movement of said arm about a vertical axis including a vertical pin, an arm portion for receipt of said pin, and a support portion adapted to be connected to the vehicle for receipt of said pin, said pin passing through said arm portion and said support portion; and said means for substantially preventing movement of said arm in a vertical direction including interfering portions of said arm portion and said support portion and spring means operatively connected between said arm and arm portion for centering said arm so that it is normally in a first position but may pivot against the bias of said spring means about said vertical axis out of the first position and so that it will be automatically returned by said spring means to the first position; wherein the improvement comprises said spring means consists of a single coil spring operatively mounted in compression between said arm and said arm portion; said arm portion comprises first and second arm portions, said first arm portion being rigidly attached to said arm and receiving said vertical pin, and said second arm portion being mounted for slidable movement with respect to said first arm portion and including a guide member received by a bushing operatively connected to said first arm portion and said arm, and said first arm portion is formed as a yoke having a pair of spaced yoke arms with said bushing mounted between said yoke arms adjacent a first end thereof, and a second end of each of said yoke arms receiving said vertical pin.

6. An assembly as recited in claim 5 wherein, said single coil spring surrounds said guide member and engages said bushing and said second arm portion.

7. An assembly as recited in claim 5 wherein a portion of at least one of said yoke arms adjacent said first end thereof is deformed to provide a stop for stopping movement of said second arm portion with respect to said first arm portion.

8. A mud-flap supporting assembly, for mounting a mud-flap on a vehicle, comprising a horizontally disposed mounting arm adapted to have a mud-flap attached thereto; means for mounting said mounting arm to a vehicle at an attachment point, including means for substantially preventing movement of said arm in a vertical direction, and means for providing pivotal movement of said arm about a vertical axis adjacent the operative attachment point of the arm to the vehicle; said means for providing pivotal movement of said arm about a vertical axis including a vertical pin, an arm portion for receipt of said pin, and a support portion adapted to be connected to the vehicle for receipt of said pin, said pin passing through said arm portion and said support portion;

spring means operatively connected between said arm and arm portion for centering said arm so that it is normally in a first position but may pivot against the bias of said spring means about said vertical axis out of the first position and so that it will be automatically returned by said spring means to the first position; and means for preventing movement of said arm in a vertical direction comprising interfering portions of said arm portion and said support portion, and means for mounting said arm and arm portions for horizontal telescopic movement with respect to each other against the bias of said spring means;

said arm portion comprises first and second arm portions, said first arm portion being rigidly attached to said arm and receiving said vertical pin, and said second arm portion being mounted for slidable movement with respect to said first arm portion and including a guide member received by a bushing operatively connected to said first arm portion and said arm to provide said telescopic movement of said second arm portion with respect to said arm; and said first arm portion being formed as a yoke having a pair of spaced yoke arms with said bushing mounted between said yoke arms adjacent a first end thereof, and a second end of each of said yoke arms receiving said vertical pin.

9. An assembly as recited in claim 8 wherein a portion of at least one of said yoke arms adjacent said first end thereof is deformed to provide a stop for stopping movement of said second arm portion with respect to said first arm portion.

10. A mud-flap supporting assembly, for mounting a mud-flap on a vehicle, comprising a horizontally disposed mounting arm adapted to have a mud-flap attached thereto; means for mounting said mounting arm to a vehicle at an attachment point, including means for substantially preventing movement of said arm in a vertical direction, and means for providing pivotal movement of said arm about a vertical axis adjacent the operative attachment point of the arm to the vehicle; said means for providing pivotal movement of said arm about a vertical axis including a vertical pin, an arm portion for receipt of said pin, and a support portion adapted to be connected to the vehicle for receipt of said pin, said pin passing through said arm portion and said support portion;

spring means operatively connected between said arm and arm portion for centering said arm so that it is normally in a first position but may pivot against the bias of said spring means about said vertical axis out of the first position and so that it will be automatically returned by said spring means to the first position; said means for preventing movement of said arm in a vertical direction comprising interfering portions of said arm portion and said support portion, and means for mounting said arm and arm portions for horizontal telescopic movement with respect to each against the bias of said spring means;

said arm portion comprising first and second arm portions, said first arm portion being rigidly attached to said arm and receiving said vertical pin, and said second arm portion being mounted for slidable movement with respect to said first arm portion and including a guide member received by a bushing operatively connected to said first arm portion and said arm to provide said telescopic movement of said second arm portion with respect to said arm;

said second arm portion further comprising an end plate portion affixed to said guide member and having surface portions thereof engaging said first arm portion for providing slidable movement therebetween, and an end face portion for abutting said support portion under the bias of said spring means;

said spring means comprising a coil spring surrounding said guide member and operatively engaging said arm bushing for receipt of said guide member, and said second arm portion end plate; and said end plate portion having a generally H-shape, receiving said first arm portion between the legs of the H, and abutting said support portion along the end face thereof during pivoting thereof against the bias of said spring means.

* * * * *